(12) United States Patent  
Rasanen

(10) Patent No.: US 7,817,648 B2  
(45) Date of Patent: Oct. 19, 2010

(54) INTERWORKING CONTROL BETWEEN DIFFERENT COMMUNICATION PARTIES

(75) Inventor: Juha Rasanen, Espoo (FI)

(73) Assignee: Nokia Corporation, Espoo (FI)

( * ) Notice: Subject to any disclaimer, the term of this patent is extended or adjusted under 35 U.S.C. 154(b) by 645 days.

(21) Appl. No.: 11/798,944

(22) Filed: May 17, 2007

(65) Prior Publication Data

US 2008/0037566 A1 Feb. 14, 2008

Related U.S. Application Data

(60) Provisional application No. 60/835,424, filed on Aug. 4, 2006.

(51) Int. Cl.
*H04L 12/66* (2006.01)

(52) U.S. Cl. ..................................... 370/401

(58) Field of Classification Search ................. 370/370, 370/352–357, 395.5–395.52, 401
See application file for complete search history.

(56) References Cited

U.S. PATENT DOCUMENTS

| 6,073,018 | A * | 6/2000 | Sallberg ................... 455/435.2 |
| 7,181,202 | B2 * | 2/2007 | Rasanen et al. ............. 455/418 |
| 2004/0252695 | A1 * | 12/2004 | Rasanen et al. ........... 370/395.2 |
| 2006/0218291 | A1 * | 9/2006 | Zhu et al. ................... 709/229 |

FOREIGN PATENT DOCUMENTS

EP 1 551 135 A2 7/2005

OTHER PUBLICATIONS

3GPP TR 29.863 V0.1.0, "*3rd Generation Partnership Project; Technical Specification Group Core Network; Feasibility Study for the Multimedia Interworking Between the IM CN Subsystem and CS Networks (Release 7)*", Jun. 2006, pp. 1-34.

3GPP TS 23.172 V5.6.0, "*3rd Generation Partnership Project; Technical Specification Group Core Network and Terminals; Technical Realization of Circuit Switched (CS) Multimedia Service UDI/RDI Fallback and Service Modification; Stage 2 (Release 5)*", Jun. 2005, pp. 1-42.

(Continued)

*Primary Examiner*—Frank Duong
(74) *Attorney, Agent, or Firm*—Mintz, Levin, Cohn, Ferris, Glovsky and Popeo, P.C.

(57) ABSTRACT

An interworking control mechanism for a communication connection between at least two parties located in different networks provides the following functions: a parameter may be added in a signalling towards one party, which interprets the parameter and shows/indicates a message to the user that a media composition change is not possible and thus prevented even if it would be instructed; otherwise, an announcement is sent from the network to the other party being incapable to execute the media composition change to inform the user about the dropping of a media stream; and a negotiation between the network and the terminal device of the party being incapable to execute the media composition change is initiated in order to modify the remaining session streams, such as to rearrange the available bandwidth and possibly to change a codec to a better one.

17 Claims, 12 Drawing Sheets

OTHER PUBLICATIONS

3GPP TS 23.172 V6.4.0, "*3rd Generation Partnership Project; Technical Specification Group Core Network and Terminals; Technical Realization of Circuit Switched (CS) Multimedia Service UDI/RDI Fallback and Service Modification; Stage 2 (Release 6)*", Mar. 2003, pp. 1-59.

3GPP TR 23.903 V6.1.0, *3rd Generation Partnership Project; Technical Specification Group Services and System Aspects; Redial Solution for Voice-Video Switching (Release 6)*, Mar. 2005, pp. 1-18.

3GPP TS 29.163 V6.9.0, *3rd Generation Partnership Project; Technical Specification Group Core Network and Terminals' Interworking Between the IP Multimedia (IM) Core Network (CN) Subsystem and Circuit Switched (CS) Networks (Release 6)*, Jun. 2006, pp. 1-129.

ITU-T, H.245, Series H: Audiovisual and Multimedia Systems, Infrastructure of Audiovisual Services-Communiction, "*Control Protocol for multimedia Communiction*", Oct. 2005, pp. 1-328.

ITU-T, "*Interworking between Session initiation Protocol (SIP) and Bearer Independent Call Control Protocol or ISDN User Part*", Q.1912.5, Series Q: Switching and Signalling related to Bearer Independent Call Control (BICC), Mar. 2004, pp. 1-101.

International Search Report PCT/IB2007/052082.

* cited by examiner

INTERWORKING CONTROL BETWEEN DIFFERENT COMMUNICATION PARTIES

CROSS-REFERENCE TO RELATED APPLICATIONS

This application claims priority of U.S. Provisional Patent Application Ser. No. 60/835,424, filed Aug. 4, 2006. The disclosure of the prior application is hereby incorporated by reference in its entirety.

BACKGROUND OF THE INVENTION

1. Field of the Invention

The present invention relates to an interworking control between different parties during a communication connection. In particular, the present invention relates to a method and an apparatus usable for an interworking mechanism in a communication connection between parties of different networks when one of these parties intends to change an original media composition of the communication connection.

For the purpose of the present invention to be described herein below, it should be noted that

- a terminal device may for example be any device by means of which a user may access a communication network; this implies mobile as well as non-mobile devices and networks, independent of the technology platform on which they are based; only as an example, it is noted that communication equipments operated according to principles standardized by the $3^{rd}$ Generation Partnership Project 3GPP and known for example as UMTS terminals are particularly suitable for being used in connection with the present invention;
- although reference is made herein to multimedia call or session comprising a video component, this exemplifies only a specific example of content; content as used in the present invention is intended to mean multimedia data of at least one of audio data, video data, image data, text data, and meta data descriptive of attributes of the audio, video, image and/or text data, any combination thereof or even, alternatively or additionally, other data such as, as a further example, program code of an application program to be accessed/downloaded;
- method steps likely to be implemented as software code portions and being run using a processor at one of the entities described herein below are software code independent and can be specified using any known or future developed programming language;
- method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices or means can be implemented as individual devices or means, but this does not exclude that they are implemented in a distributed fashion throughout the system, as long as the functionality of the device is preserved.

2. Related Prior Art

In the last years, an increasing extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that one party, e.g. a subscriber's terminal device, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the communication equipment and is connected via an interface to a corresponding core or backbone network subsystem. The core (or backbone) network subsystem switches the data transmitted via the communication connection to a destination party, such as another terminal device, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the terminal device and another communication equipment or terminal device, a database, a server, etc., one or more intermediate network elements such as control network elements, support nodes or service nodes are involved.

One application area whose importance for current and future communication systems increases comprises multimedia communication services. A multimedia call is a communication where, for example, voice, text, data, video and/or picture are used simultaneously. Multimedia calls generally require the transmission of several different types of data (video, audio, and the like) in parallel, and these data are to be transmitted and received by various different types of communication equipments or network elements, so that it is required that plural communication protocols are negotiated and appropriate parameters for the communication are adjusted.

A current technology to merge the Internet with the cellular telecommunication world is the Internet Protocol (IP) Multimedia Subsystem IMS. IMS is a standardized architecture for operators intending to provide mobile and fixed multimedia services. IMS uses a Voice over IP (VoIP) implementation based on a 3GPP standardized implementation of Session Initiation Protocol (SIP) and runs over the standard Internet Protocol (IP). Both packet-switched and circuit switched communication systems are supported.

The goal is to make available services offered by the Internet nearly everywhere by means of cellular mobile communication systems. IMS is introduced as part of the 3GPP standards since Release 5. As a part of the signalling mechanisms used between the IMS and an user equipment the Session Initiation Protocol (SIP) is used. Details of the structure and procedures executed in IMS are described in the related standards and are commonly known to a person skilled in the art so that a description thereof is omitted herein for the sake of simplicity.

It is expected that current circuit switched networks evolve towards the IMS in the coming years. Thus, for a relatively long period of time both circuit switched (CS) networks and packet switched (PS) networks, like IMS, will be used side by side. Hence, it is necessary to ensure interworking between the both CS and PS systems so that an end user experience is not jeopardized.

However, in case of multimedia calls, in particular of video calls, the situation may be complicated. Such multimedia or video calls are an important feature of newer 3G networks. During a multimedia call, for example, a user has an option to change the media composition of the call, e.g. by abandoning/dropping a video call component or by adding a data transmission component, for example. However, when a multimedia/video call is established and ongoing between, for example, a terminal device associated with an IMS network and a terminal device associated with a circuit switched (CS) network, the CS terminal device being behind a CS leg which is, for example, an ISUP (ISDN (Integrated Services Digital Network) User Part) leg. ISUP, however, does not support swapping between multimedia and speech during an ongoing session/call. In other words, the CS side does not support a change in a media composition of the communication connection which could be instructed from the other side of the connection. Thus, there may arise a situation where one party, such as the IMS terminal/user, may try to change the composition of the session by trying to add or delete a media stream to/from the session. For example, the IMS terminal/user may try to drop the video stream and turn the session/call to a plain speech session/call.

In case an offer to add a media stream is entered, the situation can be handled normally by a corresponding interworking node between the two networks where the respective parties reside, such as a Media Gateway Control Function (MGCF) as the PS/CS interworking node, by turning down the offer. This may be executed by responding with the acceptable media line description. However, in case of an offer to drop a media stream, i.e. the abandonment of a media component of the communication connection, the situation differs. Here, the offer can only be accepted by the other party. In such a PS/CS interworking case (IMS to CS connection) the other party of the PS leg is the interworking node (MGCF) which has a CS video leg, without a capability to drop the video stream, to handle. Therefore, a conflict may arise as there is no possibility to perform a media composition change at the CS side even though it is instructed since it is lying behind the ISUP leg which does not support the media composition change, in particular in case of an abandonment of a media component. On the other hand, the users of the terminal devices involved in the communication connection may feel discomfort or confusion since the communication connection parameters change in an unexpected manner.

SUMMARY OF THE INVENTION

Thus, it is an object of the invention to provide an improved mechanism for interworking control for a communication connection between different networks. In particular, it is an object of the present invention to prevent a situation to occur where a media composition change is to be performed when one party or leg of the communication connection is incapable to handle it, while the possibility to establish a communication connection between the parties is to be maintained.

Furthermore, it is an object of the present invention to provide a method and an apparatus which are capable of avoiding a feeling of discomfort or confusion by a user when a media composition change is initiated, in particular when a media component such as a video media stream is dropped by one party (e.g. because the user of the one party is not knowing whether or not the other party is using a terminal device capable of following the media composition change).

These objects are achieved by the measures defined in the attached claims.

In particular, according to one example of an aspect of the proposed solution, there is provided, for example, a method comprising determining an incapability of at least one of a first party and a first leg of a communication connection for changing a media composition of the communication connection, generating an information element indicating the incapability of the at least one of the first party and the first leg of the communication connection for changing the media composition, transmitting the information element to a second party of the communication connection.

Moreover, according to another example of an aspect of the proposed solution, there is provided, for example, an apparatus configured to determine an incapability of at least one of a first party and a first leg of a communication connection for changing a media composition of the communication connection, generate an information element indicating the incapability of the at least one of the first party and the first leg of the communication connection for changing the media composition, transmit the information element to a second party of the communication connection.

According to further refinements, these examples may comprise one or more of the following features:
- the transmission of the information element to the second party of the communication connection may be performed in a signalling during an establishment of the communication connection;
- a predefined value for an attribute parameter of a session initiation protocol may be used for the generation of the information element;
- the change of the media composition may comprise an abandonment of at least media component of the communication connection;
- an interworking control node, in particular a media gateway control function, may be used.

Furthermore, according to another example of an aspect of the proposed solution, there is provided, for example, a method comprising receiving an information element indicating the incapability of at least one of a first party and a first leg of a communication connection for changing a media composition of the communication connection, performing a processing for preventing a change of the media composition of the communication connection in a second party of the communication connection.

In addition, according to another example of an aspect of the proposed solution, there is provided, for example, an apparatus configured to receive an information element indicating the incapability of at least one of a first party and a first leg of a communication connection for changing a media composition of the communication connection, perform a processing for preventing a change of the media composition of the communication connection in a second party of the communication connection.

According to further refinements, these examples may comprise one or more of the following features:
- the information element may be stored in the second party during the communication connection;

a user of the second party may be informed of the incapability of the at least one of the first party and the first leg of the communication connection for changing the media composition by at least one of a visual or audio indication at a terminal device of the second party;

a user of the second party may be informed when performing the processing for preventing the change of the media composition of the communication connection in the second party of the communication connection;

the processing for preventing the change of the media composition of the communication connection in the second party of the communication connection may comprise a stopping of actions regarding the change of the media composition of the communication connection in the second party and towards a network;

the change of the media composition may comprise an abandonment of at least media component of the communication connection;

a terminal device of the second party may be used as the apparatus.

Furthermore, according to another example of an aspect of the proposed solution, there is provided, for example, a method comprising acquiring an instruction from a second party of a communication connection to change a media composition of the communication connection, transmitting, when a first party of the communication connection is incapable of performing the change of the media composition of the communication connection, an indication informing about the change the media composition of the communication connection to the first party of the communication connection, maintaining resources of the communication connection to the first party.

Moreover, according to another example of an aspect of the proposed solution, there is provided, for example, an apparatus configured to acquire an instruction from a second party of a communication connection to change a media composition of the communication connection, transmit, when a first party of the communication connection is incapable of performing the change of the media composition of the communication connection, an indication informing about the change the media composition of the communication connection to the first party of the communication connection, maintain resources of the communication connection to the first party.

According to further refinements, these examples may comprise one or more of the following features:

at least one of a still picture, a moving picture and a text message may be used for the indication transmitted to the first party;

the indication may be transmitted to the first party via a channel of the communication connection concerned by the change of media composition instructed by the second party;

the indication may be transmitted to the first party by a signalling procedure;

the change of the media composition may comprise an abandonment of at least media component of the communication connection;

the apparatus may be configured to function as an interworking control node, in particular a media gateway control function.

In addition, according to another example of an aspect of the proposed solution, there is provided, for example, a method comprising acquiring an instruction from a second party of a communication connection to change a media composition of the communication connection, initiating a signalling negotiation for modifying parameters of the communication connection between a network gateway node or an interworking node and a first party of the communication connection.

Furthermore, according to another example of an aspect of the proposed solution, there is provided, for example, an apparatus configured to acquire an instruction from a second party of a communication connection to change a media composition of the communication connection, initiate a signalling negotiation for modifying parameters of the communication connection between a network gateway node or an interworking node and a first party of the communication connection.

According to further refinements, these examples may comprise one or more of the following features:

modifying the parameters of the communication connection may comprise at least one of a bandwidth rearrangement for increasing a bandwidth of media components not concerned by the instruction to change the media composition, and a change of codec used for media components not concerned by the instruction to change the media composition;

the change of the media composition may comprise an abandonment of at least media component of the communication connection;

the apparatus may be configured to function as an interworking control node, in particular a media gateway control function.

By virtue of the proposed solutions, it is possible to achieve the following:

It is possible for an operator to enable an interworking also in case where one part of the communication connection is not supporting a media composition change, such as in a case of a PS-CS video connection where the CS leg being a legacy ISUP network, for example.

Generally, the quality of a communication connection can be improved. For example, it is prevented that a media component, such as video component, disappears from a connection where the other party does not support a graceful dropping. Furthermore, it is possible to prevent confusion of the users, in particular of a user not instructing a media composition change, such as the CS user, by informing this user if the other party drops one media component or the like. Finally, it is possible to flexibly rearrange the available bandwidth of the communication connection on one side, such as the CS leg, so that an increased speech quality or data rate may be achieved by the resources becoming free if a media component is dropped from the session.

The above and still further objects, features and advantages of the invention will become more apparent upon referring to the description and the accompanying drawings.

DESCRIPTION OF PREFERRED EMBODIMENTS

In the following, embodiments of the present invention are described with reference to the drawings. For illustrating the present invention, the examples and embodiments will be described in connection with a system where an IMS network is interworking with a CS network and a multimedia communication connection or session is to be performed between terminal devices located in these networks, respectively. However, it is to be noted that the present invention is not limited to an application in such a system or environment but is also applicable in other network systems, connection types and the like.

Figure 1:
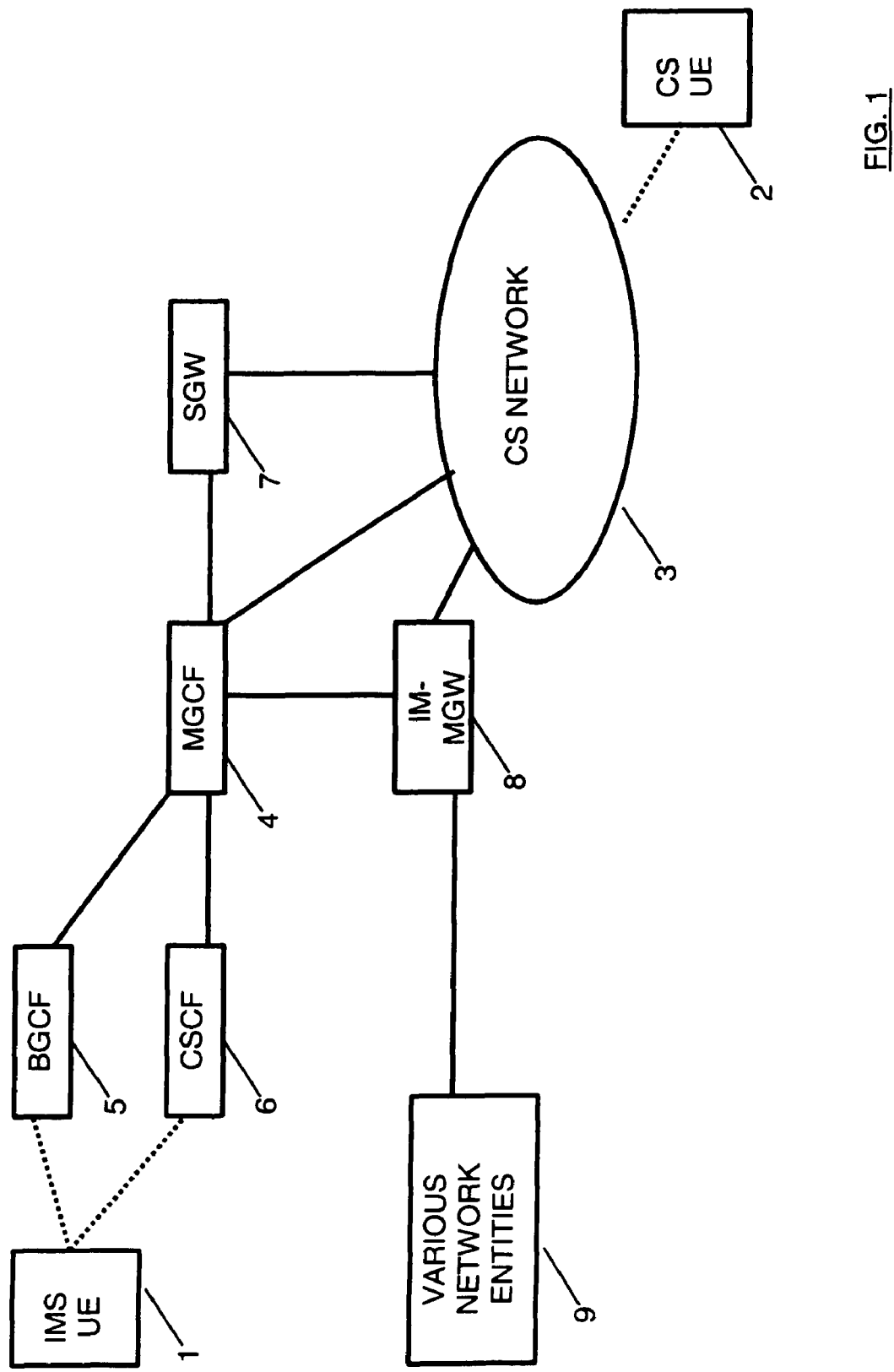
FIG. 1 shows a diagram illustrating a network architecture to which an interworking control according to the present invention is applicable.

In FIG. 1, a schematic block diagram of a basic system architecture of communication networks is shown. It is to be noted that the structure according to FIG. 1 represents only a simplified example of an architecture of a communication network environment in which the present invention is applicable. As known by those skilled in the art, there are provided several additional network elements and signaling links used for a communication connection. However, for the sake of simplicity, only those elements are depicted which are necessary for describing the invention.

Furthermore, the network elements and their functions described herein may be implemented by software, e.g. by a computer program product for a computer, or by hardware. In any case, for executing their respective functions, correspondingly used devices, such as a terminal device, core network control element like a mobile switching centre MSC, an interworking control portion and the like, an access network subsystem element like a Base Station Subsystem BSS element or Radio Access Network RAN element and the like, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like. This means that the respective network environments, i.e. the IMS domain and the CS domain, may comprise several elements and/or functionalities not shown which are known, however, to a person skilled in the art and therefore not described in greater detail herein.

According to FIG. 1, reference signs 1 and 2 denote respective terminal devices or user equipments (UE) located in and associated to different networks. In the example shown in FIG. 1, terminal device 1 may be located in an IMS network (therefore, it is also referred to as an IMS terminal device or UE) while terminal device 2 may be located in a CS network (therefore, it is also referred to as a CS terminal device or UE). The CS network is denoted by reference sign 3. As indicated above, for simplification reasons, the details of the CS network, such as access subsystem or core network elements, are not shown or described in detail as they are commonly known to a person skilled in the art. Reference signs 4 to 8 are related to network elements or functions of the IMS network. Reference sign 5 denotes a BGCF (Breakout Gateway Control Function) which is a SIP server that includes routing functionality based on telephone numbers. It is used when calling from the IMS to a phone in a CS network. Reference sign 6 denotes a CSCF (Call State Control Function) which are SIP servers or proxies fulfilling several roles (such as Interrogating CSCF, Proxy CSCF, Serving CSCF) and used to process SIP signalling packets in the IMS. Reference sign 4 denotes a MGCF (Media Gateway Controller Function) which is connected to the BGCF 5 and the CSCF 6 via signalling paths. Reference sign 7 denotes a SGW (Signalling Gateway) and reference sign 8 denotes a MGW (Media Gateway) or IP Multimedia MGW (IM-MGW) as a network gateway node. Both the SGW 7 and the MGW 8 are connected to the MGCF 4 via signalling paths. The MGCF 4 is used as an interworking control portion and executes a call control protocol conversion between SIP and ISUP towards the CS network part 3 to which it is connected via a corresponding signalling path. Furthermore, it interfaces with the SGW 7 and controls the resources in the MGW 8 via an interface. The MGW 8 interfaces with the media plane of the CS network 3 and provides an interface between the PS domain and the CS domain. The SGW 7 interfaces with the signalling plane of the CS network and can be used to pass ISUP from the MGCF 4 to the CS network 3. Furthermore, it forwards signalling to and from the MGCF 4. Reference sign 9 denotes various network entities, such as user equipments, core network elements or gateways, like a GGSN (GPRS (General Packet Radio System) Gateway Support Node), application servers or the like, which can be connected by the IM-MGW 8, for example, via an IP based interface or the like.

It is to be noted that the MGCF 4 and the IM-MGW 8 may be combined in one element which is also referred to as an interworking node (not shown).

In the following, examples of an interworking control according to embodiments of the present invention are described in greater detail.

Generally, the examples for the interworking control are related to a situation where one party of a communication connection, for example, the IMS UE 1 according to FIG. 1 during a multimedia communication connection or session comprising several media streams or components, such as a speech component and a video component or the like, intends to modify a media composition of the communication connection to a second party, such as the CS UE 2 according to FIG. 1. Such a modification may comprise in particular the abandonment of one media component of the communication connection, such as a dropping of the video stream. However, in the cases illustrated below, it is assumend that the second party and/or the communication leg of the second party is/are not capable to modify the media composition, such as in case of an ISUP leg as the CS leg of the system shown in FIG. 1.

Figure 6:
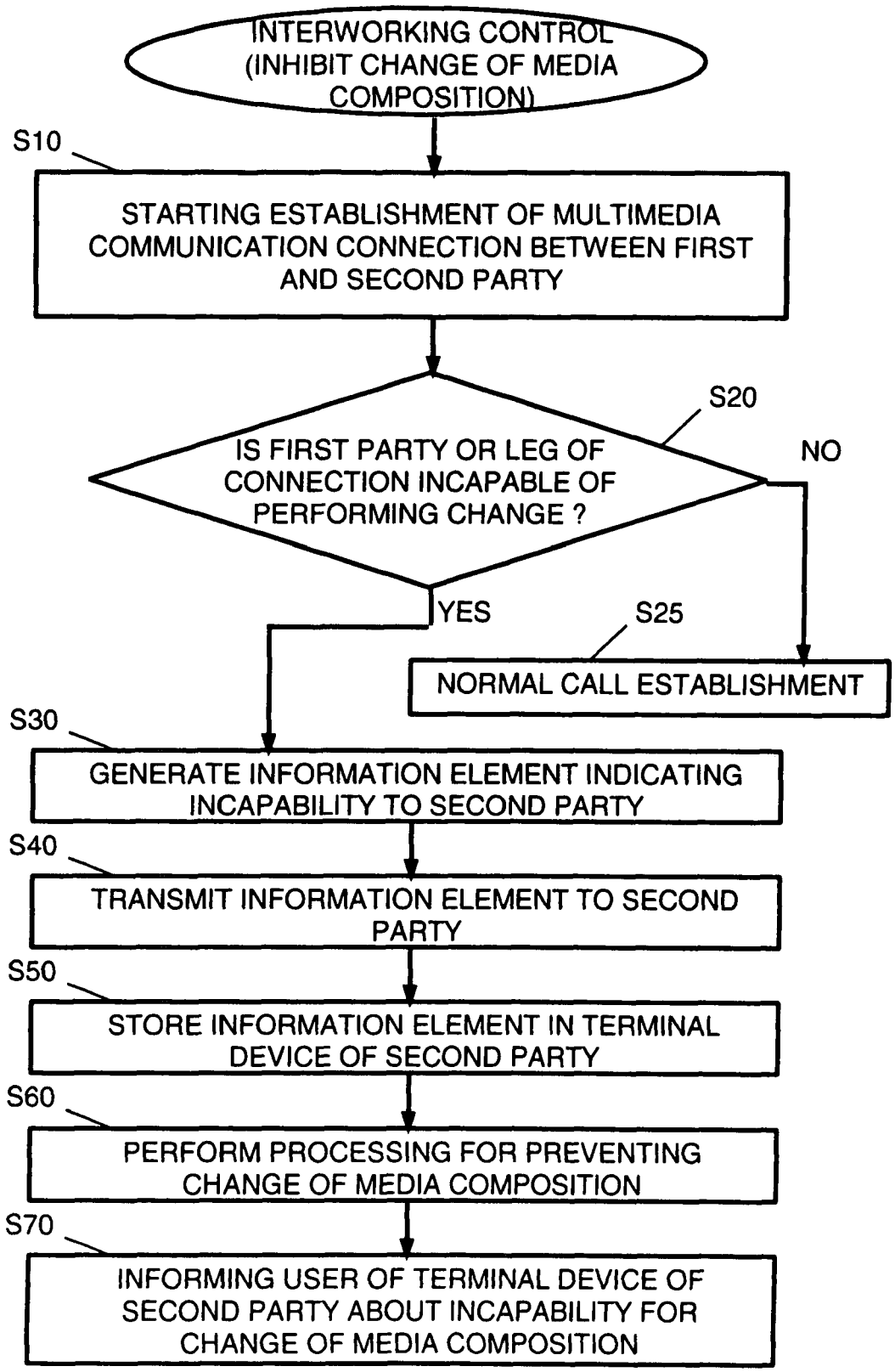
FIG. 6 shows a flow chart of an interworking control processing according to an example of an embodiment of the present invention.

In FIG. 6, a flow chart of an interworking control processing according to a first example of an embodiment of the present invention is shown.

In step S10, an establishment of a communication connection, such as of a multimedia session, is started between at least two parties. The first party may be located in a CS network, such as the CS UE 2 in the CS network 3 according to FIG. 1, while the second party may be, for example, the IMS UE 1 in the IMS network environment of FIG. 1. The establishment may be executed basically in accordance with a normal establishment of such a communication connection including signalling between corresponding network elements as known to those skilled in the art.

According to the present example, during the establishment procedure, it is determined by the network, for example by an interworking control portion like the MGCF 4, whether or not one of the parties fulfills predefined requirements necessary for a call control, for example if it has the capability to perform a change of a media composition of the multimedia session during the session. In other words, it is determined in step S20 whether or not the parties or the communication legs are incapable of performing a change in a media composition. In particular, it is determined whether the parties (or the communication legs before the terminal devices thereof) allow, for example, to drop a component of the multimedia session in such a media composition change, like an abandonment of a video stream or component. This determination can be effected, for example, by determining the kind of the parties and the communication legs thereof and by checking pre-stored data indicating the capabilities of the respective parties and legs.

If the determination in step S20 is such that the parties fulfill the predefined requirements necessary for the call control (i.e. NO at step S20), for example since they have the capability to perform a change of a media composition of the multimedia session during the session, the call may be established in the normal way (step S25).

On the other hand, for example in the situation illustrated in FIG. 1, the interworking control portion (the MGCF 4) determines that the first party, i.e. the CS UE 2, lies behind an ISUP leg which does not fulfill the requirement, for example, since it does not support swapping between multimedia and speech during an ongoing session or call. Therefore, the determination in step S20 is YES and the processing proceeds to step S30. In step S30, the interworking control portion, such as the MGCF 4, generates an information element which is used to indicate the incapability of the first party to change the media composition during the ongoing communication connection or session. The information element preferably has a predefined structure, for example a predefined value for an attribute parameter of a session protocol used for signalling towards the second party. In the example shown in FIG. 1, the information element may be coded, for example, as an attribute line in the Session Description Protocol SDP of SIP (e.g. a value "a=X-fixed-media-composition"), which is easy to implement and advantageously does not require additional definition in the related standards.

When the information element is generated, it is transmitted to the second party of the communication connection (step S40), i.e. to a party of the communication connection which would be capable to perform a change of the media composition also during the ongoing session. According to the system shown in FIG. 1, the information element is sent to the IMS UE 1. The transmission is preferably executed during the establishment procedure of the communication connection. For example, in the system of FIG. 1, the information element is introduced in a SIP signalling to the IMS UE 1, which is described below.

On the receiving side of the information element transmission in step S40, when the information element is received, it is stored in a memory for the duration of the communication connection (step S50), i.e. for the duration of the ongoing multimedia session whose establishment is started in step S10.

In case that the second party of the communication connection starts a media composition change of the communication connection during the ongoing session and the information element regarding the incapability of the first party for such a change is stored, in step S60, a processing is performed on the second party side (i.e. the IMS side in FIG. 1) which prevents the change of the media composition. For example, in case the user of the terminal device IMS UE 2 of FIG. 1 instructs during the ongoing session to drop one or more of the media streams of the multimedia session, such as the video component, the terminal device IMS UE 1 is configured not to start any actions regarding a signalling for abandoning the corresponding media stream(s) of the session towards the network. Preferably, also in the terminal device IMS UE 1 itself, no processing regarding an abandonment of the media stream(s) is initiated.

According to the present example, in reply to the instruction of the user to change the media composition, the user is informed by the terminal device IMS UE 1 in step S70 about the incapability of the other party of the communication connection to perform a change as instructed. In other words, the user is informed, for example, by means of a visual indication and/or a tone or voice announcement that the media composition change is prevented (i.e. not possible to be executed) and/or the media composition is fixed in this session. Optionally, also the reason why the change, such as dropping of the video stream, being denied may be indicated.

It is to be noted that the user may also be informed by the terminal device that a media composition change during an ongoing session or call is not possible or prevented when the information element is received or stored in the terminal device IMS UE 1, for example after step S50.

Thus, according to this example of an embodiment of the present invention, it is possible to prevent a media stream dropping from occurring by inhibiting a corresponding processing at the party which would normally be able to execute such a media composition change. The user is then preferably informed about the inhibition of the media composition change despite a corresponding instruction in order to avoid confusion.

Figure 2:
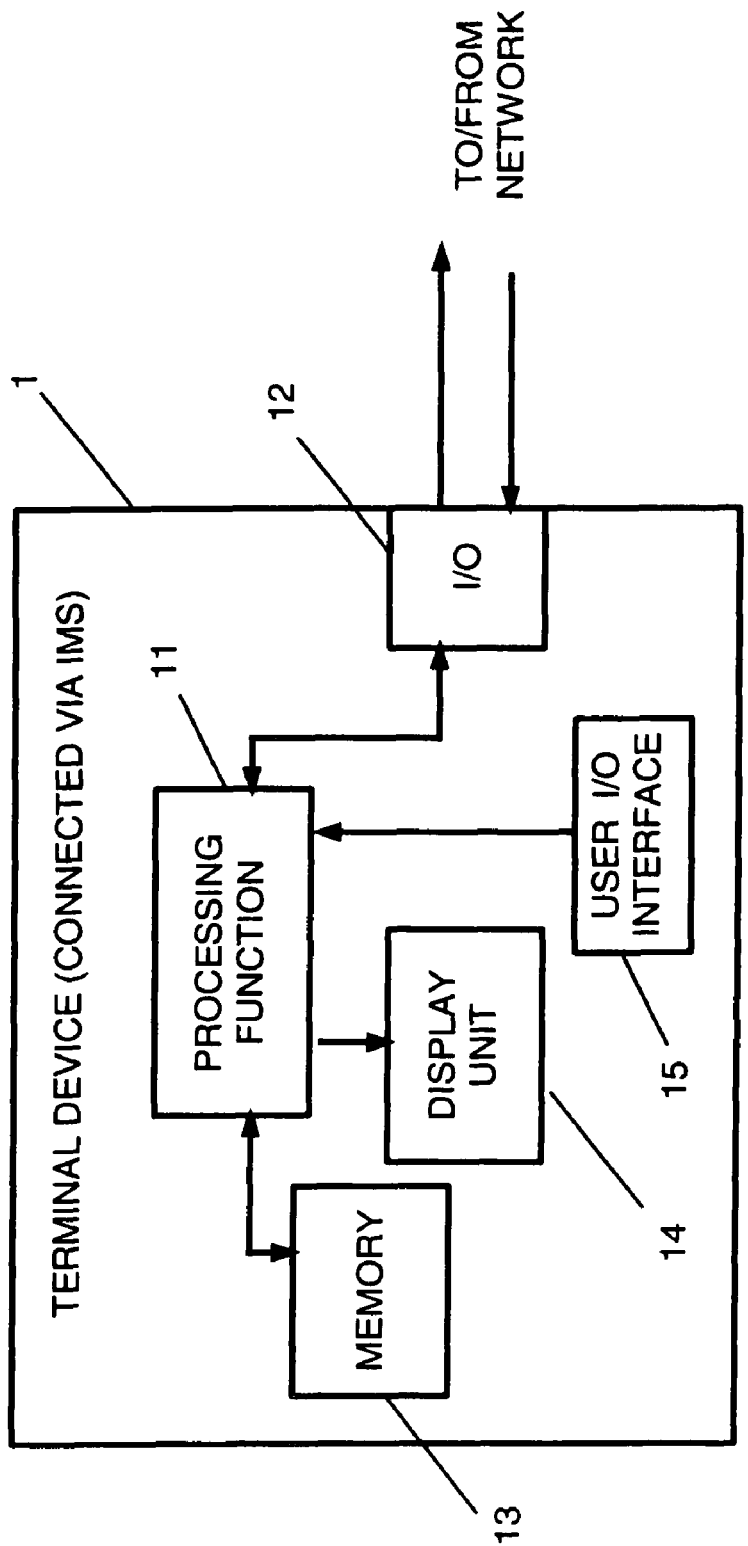
FIG. 2 shows a block circuit diagram of a terminal device according to an example of an embodiment of the present invention.

In FIG. 2, a block circuit diagram of a terminal device, for example the IMS UE 1 of FIG. 1, according to the present example of an embodiment of the invention is shown. It is to be noted that the terminal device comprises several further elements or functions than those described in connection with FIG. 2 which are omitted herein for the sake of simplicity as they are not essential for understanding the invention.

The terminal device 1 according to FIG. 2 comprises a processing function 11, such as a CPU or the like, which executes instructions given by programs or the like related to the processing shown in FIG. 6, for example, concerning a prevention of an instructed media composition change. The processing function 11 is connected to an input/output (I/O) unit 12 used for communicating with the network (for example, the information element sent according to step S40 may be received via the I/O 12). Furthermore, the processing function is connected to a memory 13 which is used for storing the information element. A display unit 14 is provided for informing the user as described in connection with step S70 of FIG. 6. The display unit 14 may be, for example, the standard display unit of the terminal device 1. Alternatively or additionally, a speaker (not shown) or the like may be used for informing the user. Furthermore, the terminal device 1 comprises a user I/O interface 15 comprising, for example, a keyboard, by means of which a user can input instructions to be processed by the processing function 11, such as an instruction regarding a change of media composition.

Figure 3:
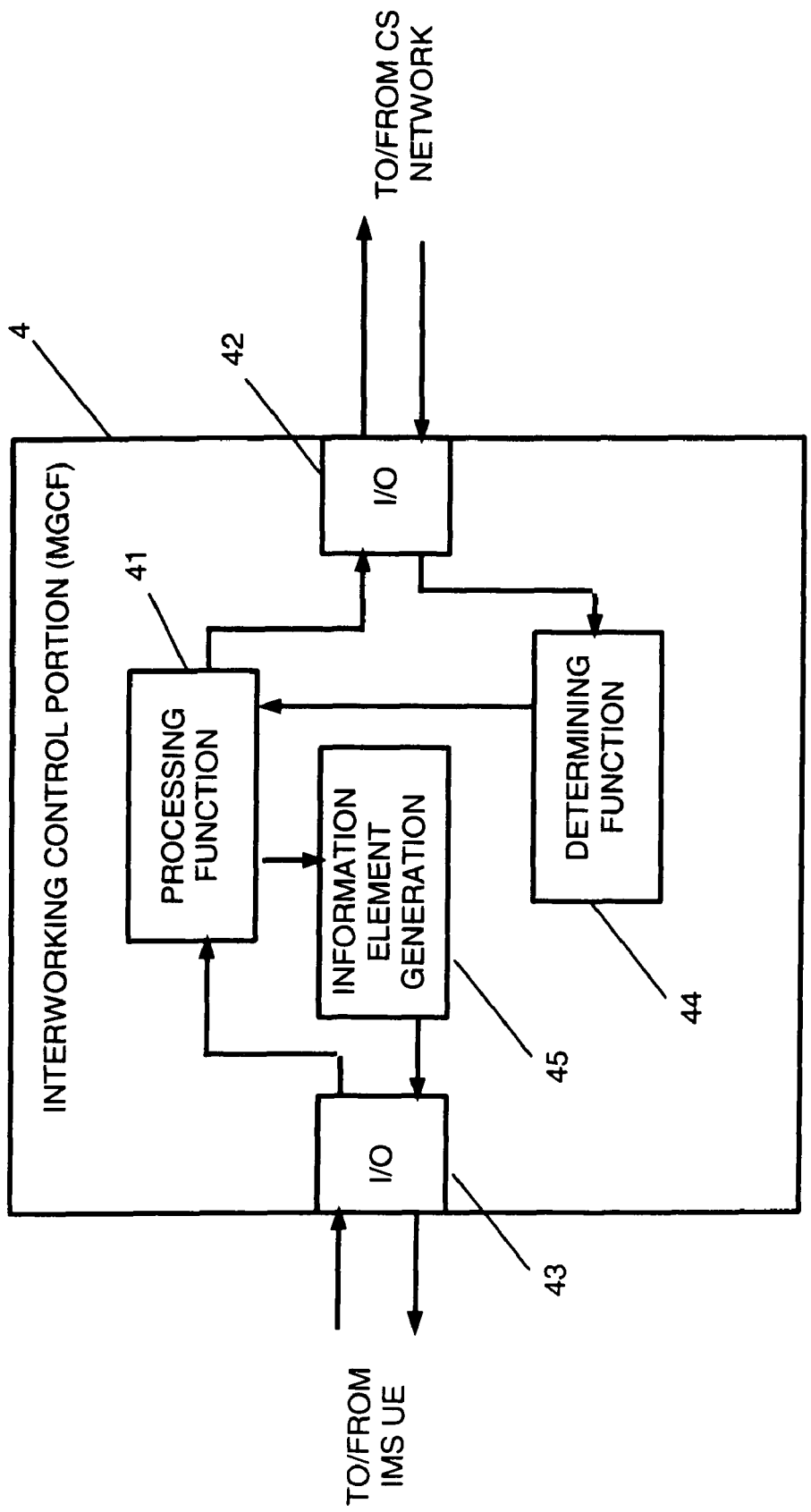
FIG. 3 shows a block circuit diagram of an interworking control portion according to an example of an embodiment of the present invention.

In FIG. 3, a block circuit diagram of an interworking control portion or element, for example the MGCF 4 of FIG. 1, according to the present example of an embodiment of the invention is shown. It is to be noted that the interworking control portion comprises several further elements or functions than those described in connection with FIG. 3 which are omitted herein for the sake of simplicity as they are not essential for understanding the invention.

The interworking control portion 4 according to FIG. 3 comprises a processing function 41, such as a CPU or the like, which executes instructions given by programs or the like related to the processing shown in FIG. 6, for example, concerning the determination of an incapability of one party or leg to execute a media component change and a generation of a corresponding information element. Reference signs 42 and 43 denote input/output (I/O) units connected to the processing function 41 and used for communicating with networks (for example, the information element sent according to step S40 may be transmitted via the I/O 43). The I/O 42 and 43 may also be combined in one member, such as a transceiver unit or the like. Reference sign 44 denotes a determining function connected to the I/O 42 and the processing function 41 for determining the capability of the networks communicating in a communication connection regarding a media composition change or the like. It is to be noted that the determining function 44 may also be part of the processing function 41. Reference sign 45 denotes an information element generation portion which is connected to and controlled by the processing function 41 for generating the information element informing about the incapability of one party or leg in case the determining function 44 determines such an incapability. The information element generation portion 45 may also be part of the processing function 41. The information element may then be transmitted to the other party via the I/O 43.

Figure 4:
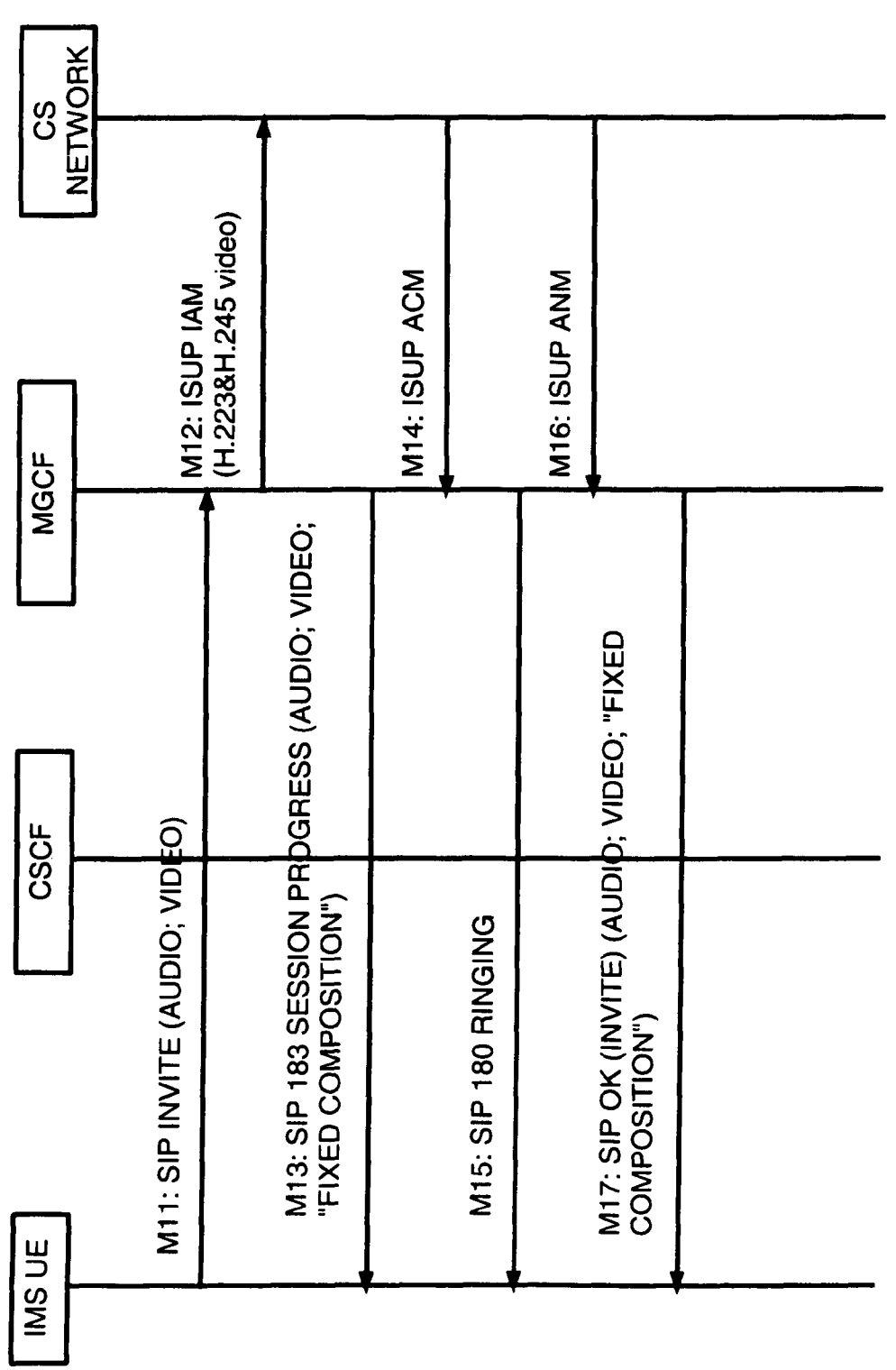
FIG. 4 shows a signalling diagram of an interworking control according to an example of an embodiment of the present invention.
Figure 5:
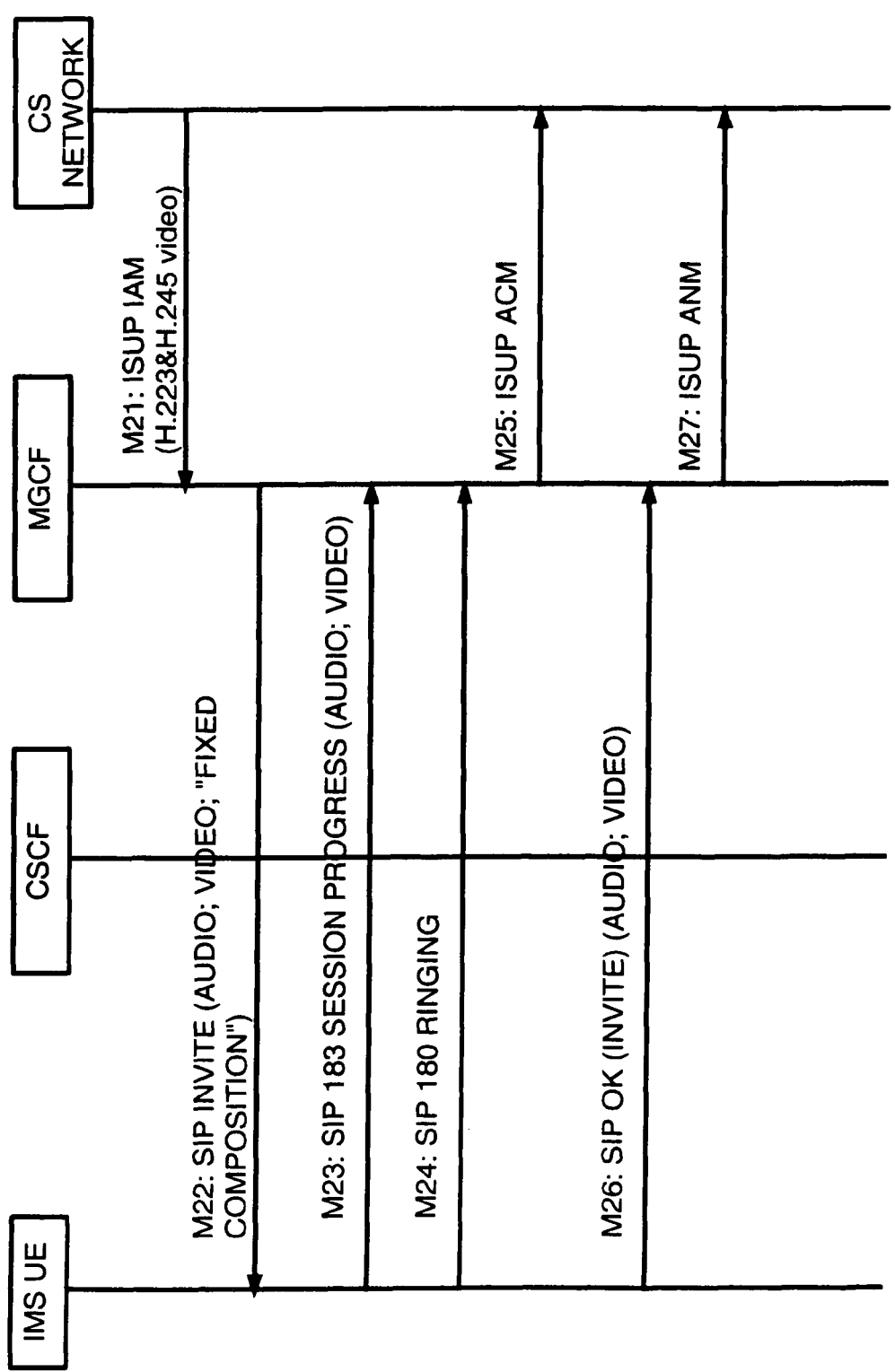
FIG. 5 shows a signalling diagram of an interworking control according to an example of an embodiment of the present invention.

In FIGS. 4 and 5, signalling diagrams describing a respective signalling flow in the network environment according to FIG. 1 when executing an interworking control according to the present example of an embodiment of the invention are shown.

In FIG. 4, a case of an IMS originated CS terminated session establishment is shown. This means that the IMS UE 1 has started the communication connection establishment towards the CS UE 2, for example the establishment of a multimedia connection. It is assumed in the following that the interworking control portion, i.e. the MGCF 4, determines that the connection leg leading to the CS UE 2 is incapable to fulfill the predefined requirements for a call control, i.e. is incapable of supporting a media composition change like an abandonment of a media stream during the ongoing session.

In message M11, the IMS UE 1 initiates the establishment of the communication connection by sending a SIP Invite message via the CSCF 6 to the MGCF 4. In the message M11, parameters for defining the resources or streams requested for the connection are defined, such as audio and video. The MGCF 4 sends in message M12 an ISUP IAM (Initial Address Message) including a request for a negotiation of connection parameters to the CS UE 2, for example a negotiation concerning ITU-T communication protocols H.223 and a H.245 Video.

Furthermore, in message M13, the MGCF 4 sends to the IMS UE 1 via the CSCF a SIP Session Progress message. In this message M13, the MGCF 4 may include the information element ("fixed composition") indicating the incapability of the other party or leg of the communication connection (the CS side) for performing a media composition change during the session. In other words, the interworking control portion indicates towards the IMS system that the media composition is fixed in the CS leg, i.e. a service change from multimedia to speech, for example, is not possible and the IMS terminal device should not later try to change the media composition agreed upon the session establishment.

The establishment of the communication connection is continued normally, for example by messages M14 ISUP ACM (Address Complete Message), M15 SIP Ringing and M16 ISUP ANM (Answer Message). In message M17, the SIP Invite message M11 is answered wherein the information element indicating the incapability of the other party or leg of the communication connection (the CS side) for performing a media composition change during the session may be included.

As described, in an IMS originated case, the information can be transferred e.g. in a SIP response message to the INVITE message starting the establishment of the session. The information element may be coded e.g. as an attribute line in the SDP (e.g. "a=X-fixed-media-composition"), or the like. However, there are also other possible signalling mechanisms or messages which can be used for transmitting the information element to the IMS side. For example, a SIP header (a new or an existing one with possibly new parameters or parameter values) can be used within various SIP messages to indicates the capabilities/incapabilities.

In FIG. 5, on the other hand, a case of an CS originated IMS terminated session establishment is shown. This means that the CS UE 2 has started the communication connection establishment towards the IMS UE 1, for example the establishment of a multimedia connection. It is assumed in the following that the interworking control portion, i.e. the MGCF 4, determines that the connection leg leading to the CS UE 2 is incapable to fulfill the predefined requirements for a call control, i.e. is incapable of supporting a media composition change like an abandonment of a media stream during the ongoing session.

In message M21, the CS UE 1 initiates the establishment of the communication connection by sending an ISUP IAM including a request for a negotiation of connection parameters to the CS UE 2, for example a negotiation concerning ITU-T communication protocols H.223 and a H.245 Video. The MGCF 4 sends a message M22 with a SIP Invite message via the CSCF 6 to the IMS UE 1. In the message M22, parameters for defining the resources or streams requested for the connection are defined, such as audio and video. Furthermore, the MGCF 4 may include in the SIP Invite message M22 the information element ("fixed composition") indicating the incapability of the other party or leg of the communication connection (the CS side) for performing a media composition change during the session. In other words, the interworking control portion indicates towards the IMS system that the media composition is fixed in the CS leg, i.e. a service change from multimedia to speech, for example, is not possible and the IMS terminal device should not later try to change the media composition agreed upon the session establishment.

The establishment of the communication connection may then continue normally, for example by messages M23 SIP Session Progress message (comprising the audio and video parameters), M24 SIP Ringing, M25 ISUP ACM (Address Complete Message), M26 SIP OK (Invite) message (comprising the audio and video parameters) and M27 ISUP ANM (Answer Message).

As described, in an CS originated case, the information can be transferred e.g. in a SIP Invite message starting the establishment of the session towards the IMS side. Similarly to the above described IMS originated case, the information element may be coded e.g. as an attribute line in the SDP (e.g. "a=X-fixed-media-composition"), or the like. However, there are also other possible signalling mechanisms or messages which can be used for transmitting the information element to the IMS side. For example, a SIP header (a new or an existing one with possibly new parameters or parameter values) can be used within various SIP messages to indicates the capabilities/incapabilities.

In the following, a further example of an embodiment of the present invention is described in connection with FIGS. 7 to 10.

While in the foregoing example media composition change, such as an abandonment of a media stream or component, is avoided by sending an information element to the party which normally could perform such a media composition change and by executing a corresponding processing, the present example is related to a case where a media composition change is instructed by one party even though the other party or leg of the communication connection is not capable of changing the media composition.

For example, such a situation may arise in case one party is not aware of the incapability of the other party, e.g. because the terminal device (IMS UE 1, for example) does not support/understand an indication mechanism for informing about the incapability of the other party and/or the user does not know whether the other party is using a CS terminal or a PS terminal.

Figure 10:
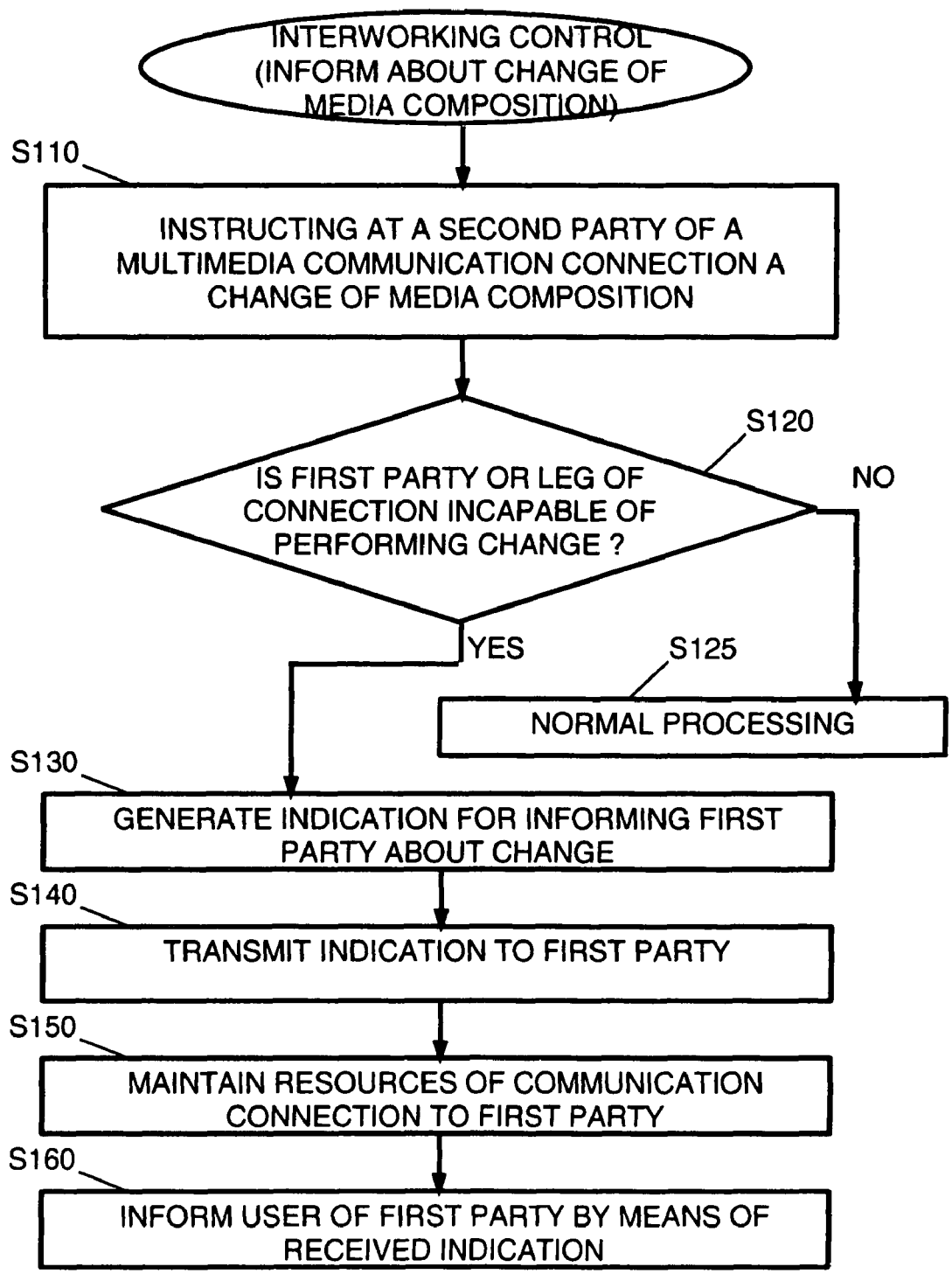
FIG. 10 shows a flow chart of an interworking control processing according to the further example of an embodiment of the present invention.

In FIG. 10, a flow chart of a interworking control processing according to the further example of an embodiment of the present invention is shown. It is assumed that a communication connection is already established between the parties and that, for example, a multimedia session comprising video and audio streams is going on. The first party of the connection may be located in a CS network, such as the CS UE 2 in the CS network 3 according to FIG. 1, while the second party may be, for example, the IMS UE 1 in the IMS network environment of FIG. 1.

In step S110, an instruction from one party of the communication connection, e.g. the IMS UE 1, is received by the interworking control portion (the MGCF 4, for example) in which a change of a media composition of the multimedia communication connection is commanded. For example, the abandonment of at least one media stream or component, such as the video component, is instructed.

According to the present example, it is determined by the network, for example by the MGCF 4, whether or not one of the parties or legs fulfills predefined requirements necessary for a call control, for example if it has the capability to perform a change of a media composition of the multimedia session during the session. In other words, it is determined in step S120 whether or not the parties or the communication legs are incapable of performing a change in a media composition. In particular, it is determined whether the parties (or the communication legs before the terminal devices thereof) allow, for example, to drop a component of the multimedia session in such a media composition change, like an abandonment of a video stream or component. This determination can be effected, for example, by determining the kind of the parties and the communication legs thereof and by checking pre-stored data indicating the capabilities of the respective parties and legs.

If the determination in step S120 is such that the parties fulfill the predefined requirements necessary for the call control (i.e. NO at step S120), for example since they have the capability to perform a change of a media composition of the multimedia session during the session, the processing for a media composition change may be continued in the normal way (step S125).

On the other hand, for example in the situation illustrated in FIG. 1, the interworking control portion (the MGCF 4) determines that the first party, i.e. the CS UE 2, lies behind an ISUP leg which does not fulfill the requirement, for example, since it does not support swapping between multimedia and speech during an ongoing session or call. Therefore, the determination in step S120 is YES and the processing proceeds to step S130. It is to be noted that the IMS side has to accept the instruction to abandon or drop the respective media stream(s).

In step S130, the interworking control portion, such as the MGCF 4, generates an indication or information element which is used to inform the party not being capable to execute the media composition change as instructed about the modification, and transmits it to the related party (step S140). In other words, when considering the network environment according to FIG. 1 as an example, the network connects an announcement towards the CS party to inform it about the media composition change, for example the abandonment of the video stream, by the PS party (IMS UE 1). The information element or announcement may be, for example, a video only announcement through the video channel in the CS leg. The usage of the video channel, i.e. of the channel which is concerned by the media composition change as instructed, is advantageous since it is possible to transmit the announcement without disturbing the ongoing speech session. The announcement may be transmitted as a still or moving picture with or without text, or just text.

Alternatively to the video only announcement through the video channel in the CS leg, a corresponding announcement may also be sent by using a signalling path to the CS network, such as an UUS (user-to-user) signalling feature of ISUP between the network and the CS terminal device 2.

Even though the abandonment of the at least one media stream is instructed, corresponding resources which has been established for the original communication connection may be maintained towards the party not being capable of performing the media composition change (step S150). In other words, the session/call is still going on with the existing media stream(s), i.e. the video component, for example, stays on in the CS leg. Thus, the interworking control portion may use the video component to send the announcement to the CS terminal device to inform the user about the change of the end-to-end connection to speech only. The information or announcement is displayed, for example, on the basis of the information element transmitted in step S140 to the user in a corresponding display portion of the CS UE 2 (step S160).

Figure 7:
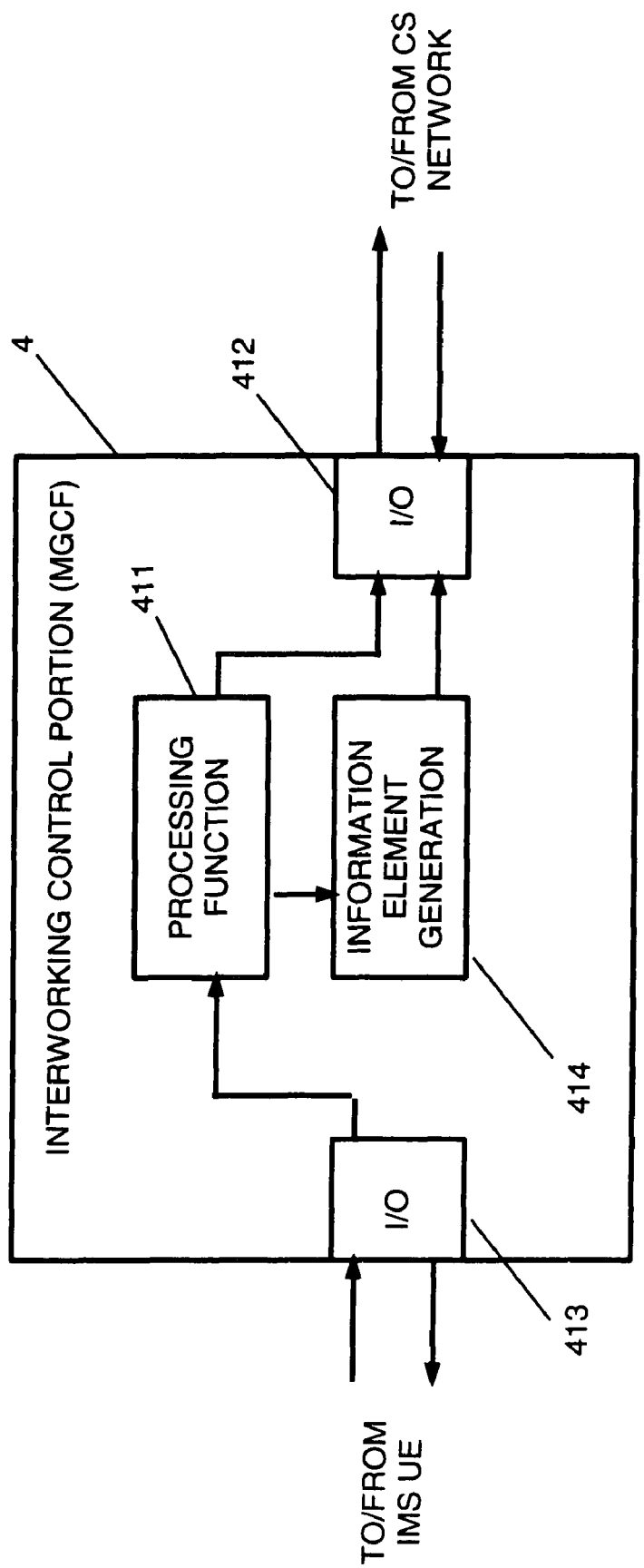
FIG. 7 shows a block circuit diagram of an interworking control portion according to a further example of an embodiment of the present invention.

In FIG. 7, a block circuit diagram of an interworking control portion or element, for example the MGCF 4 of FIG. 1, according to the further example of an embodiment of the invention is shown. It is to be noted that the interworking control portion comprises several further elements or functions than those described in connection with FIG. 7 which are omitted herein for the sake of simplicity as they are not essential for understanding the invention.

The interworking control portion 4 according to FIG. 7 comprises a processing function 411, such as a CPU or the like, which executes instructions given by programs or the like related to the processing shown in FIG. 10, for example, concerning the determination of an incapability of one party or leg to execute a media component change and a generation of an information element or announcement informing about the change of the media composition. Reference signs 412 and 413 denote input/output (I/O) units connected to the processing function 411 and used for communicating with networks (for example, the information element sent according to step S140 may be transmitted via the I/O 412). The I/O 412 and 413 may also be combined in one member, such as a transceiver unit or the like. Reference sign 414 denotes an information element generation portion which is connected to and controlled by the processing function 411 for generating the information element or announcement informing about media composition change instructed and executed on the IMS side, for example. The information element generation portion 414 may also be part of the processing function 411. The information element may then be transmitted to the CS party via the I/O 412.

There may also be provided a determining function (not shown) connected to the I/O 412 and the processing function 411 for determining the capability of the networks communicating in a communication connection regarding a media composition change or the like. It is to be noted that the determining function may be part of the processing function 411.

Figure 8:
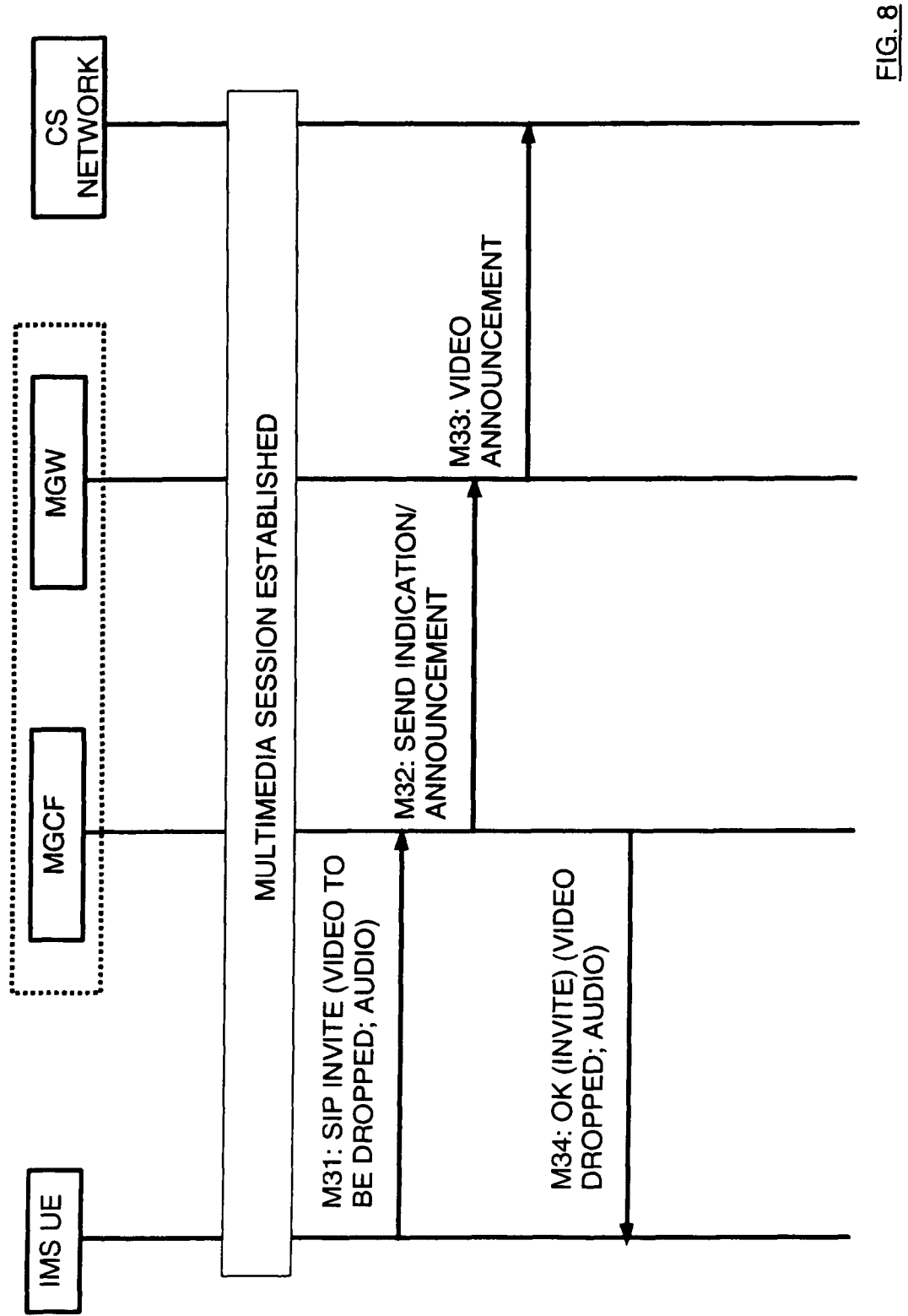
FIG. 8 shows a signalling diagram of an interworking control according to the further example of an embodiment of the present invention.
Figure 9:
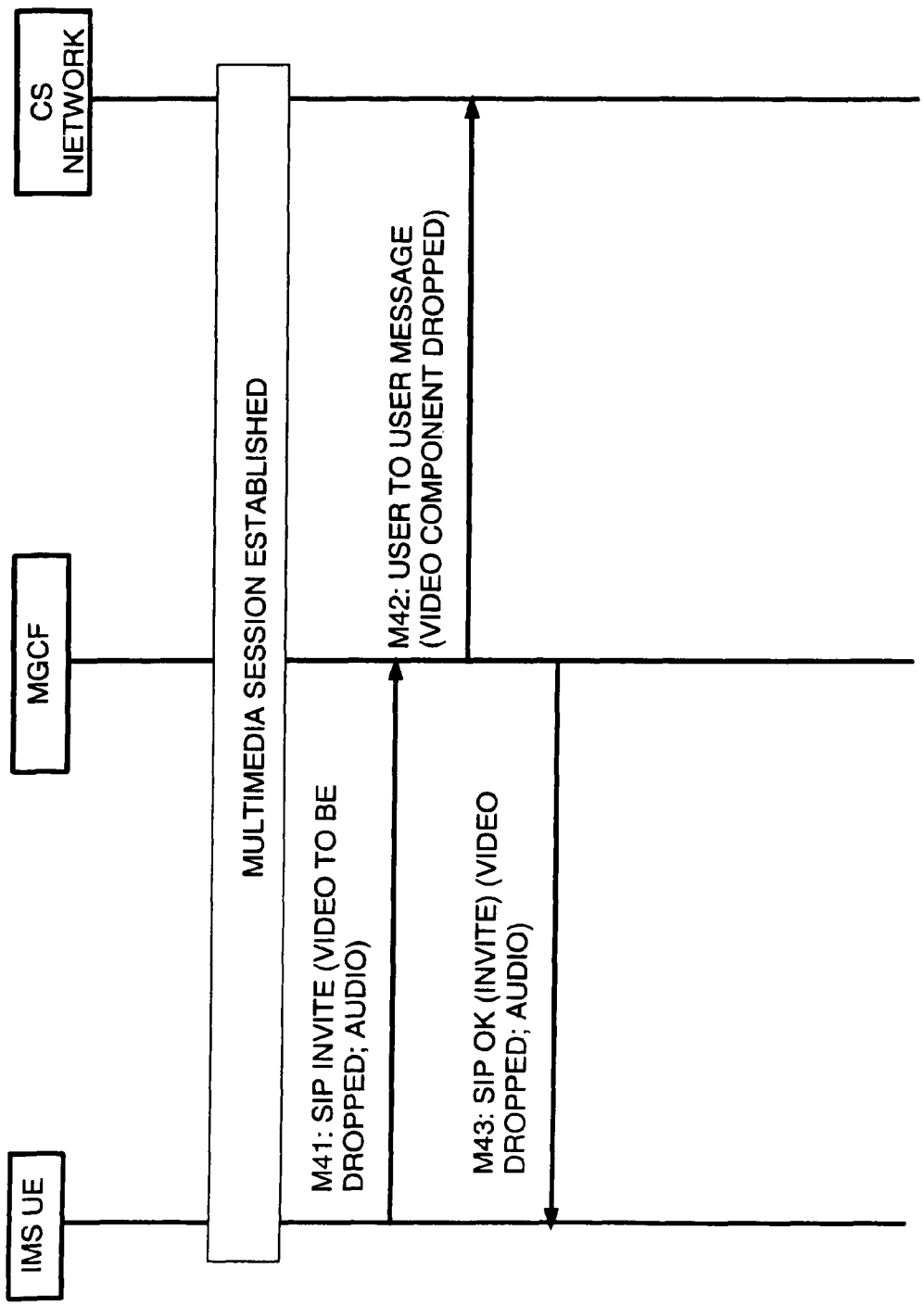
FIG. 9 shows a signalling diagram of an interworking control according to the further example of an embodiment of the present invention.

In FIGS. 8 and 9, signalling diagrams describing a respective signalling flow in the network environment according to FIG. 1 when executing an interworking control according to the further example of an embodiment of the invention are shown.

According to FIG. 8, a case is shown where the announcement is transmitted to the CS network side via the media channel concerned by the change, for example the video channel in the CS leg which is maintained. During an established multimedia session, an instruction from the IM CN subsystem is received instructing a modification from multimedia to speech during the ongoing session. As mentioned above, the CS leg supports, for example, ISUP. The interworking control portion MGCF 4 receives a corresponding SIP INVITE message M31 that indicates the dropping of the video media from the session. The MGCF 4 can only accept the dropping of the media component and acknowledges the INVITE message M31 with a 200 OK message M34. However, the video component stays on in the CS leg. The MGCF 4 may use the video component to send an announcement via the MGW 8 to the CS terminal device to inform the user about the change of the end-to-end connection to speech only (messages M32 and M33).

According to FIG. 9, a case is shown where the announcement or indication for informing about the media composition change, e.g. of the dropping of the video component, is transmitted to the CS network side by means of a signalling procedure. In the example shown in FIG. 9, the indication or announcement is sent by using a supplementary service known as UUS (user-to-user) signalling of ISUP between the network and the CS terminal (message M42). The further messages M41 and M43 correspond to messages M31 and M34 of FIG. 8, respectively.

According to the further example described above, an announcement or indication is transmitted to the party of a communication connection, which is not capable to perform a media composition change, for example, in case such a media composition change is instructed by the other party of the communication connection. Thus, the user of the first party can be suitably informed about the end of the respective media stream(s) and confusion can be avoided. In order to inhibit a conflict in the system, the media stream(s) instructed to be abandoned are maintained towards the side not being capable of performing the change of media composition.

In the following, another example of an embodiment of the present invention is described in connection with FIGS. 11 and 12.

While in the foregoing examples in case of a media composition change, such as an abandonment of a media stream or component, an information element is sent to the parties involved in the communication connection, in the present example the media composition change is used to trigger a signalling negotiation on the connection side which is incapable to perform such a media composition change.

Figure 12:
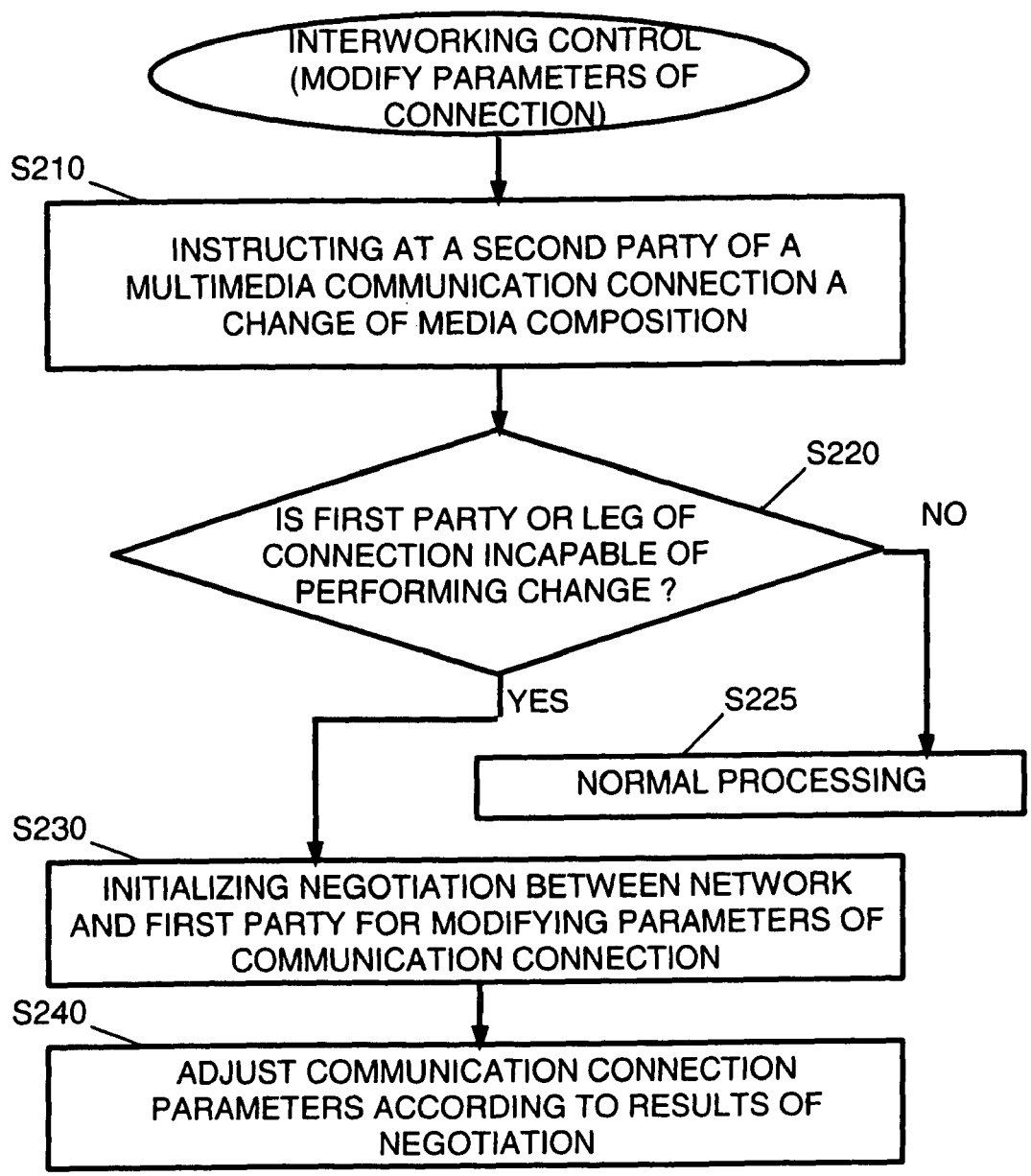
FIG. 12 shows a flow chart of an interworking control processing according to the another example of an embodiment of the present invention.

In FIG. 12, a flow chart of a interworking control processing according to the further example of an embodiment of the present invention is shown. It is assumed that a communication connection is already established between the parties and that, for example, a multimedia session comprising video and audio streams is going on. The first party of the connection may be located in a CS network, such as the CS UE 2 in the CS network 3 according to FIG. 1, while the second party may be, for example, the IMS UE 1 in the IMS network environment of FIG. 1.

In step S210, an instruction from one party of the communication connection, e.g. the IMS UE 1, is received by the interworking control portion (the MGCF 4, for example) in which a change of a media composition of the multimedia communication connection is commanded. For example, the abandonment of at least one media stream or component, such as the video component, is instructed.

According to the present example, it is determined by the network, for example by the MGCF 4, whether or not one of the parties or legs fulfills predefined requirements necessary for a call control, for example if it has the capability to perform a change of a media composition of the multimedia session during the session. In other words, it is determined in step S220 whether or not the parties or the communication legs are incapable of performing a change in a media composition. In particular, it is determined whether the parties (or the communication legs before the terminal devices thereof) allow, for example, to drop a component of the multimedia session in such a media composition change, like an abandonment of a video stream or component. This determination can be effected, for example, by determining the kind of the parties and the communication legs thereof and by checking pre-stored data indicating the capabilities of the respective parties and legs.

If the determination in step S220 is such that the parties fulfill the predefined requirements necessary for the call control (i.e. NO at step S220), for example since they have the capability to perform a change of a media composition of the multimedia session during the session, the processing for a media composition change may be continued in the normal way (step S225).

On the other hand, for example in the situation illustrated in FIG. 1, the interworking control portion (the MGCF 4) determines that the first party, i.e. the CS UE 2, lies behind an ISUP leg which does not fulfill the requirement, for example, since it does not support swapping between multimedia and speech during an ongoing session or call. Therefore, the determination in step S220 is YES and the processing proceeds to step S230. It is to be noted that the IMS side has to accept the instruction to abandon or drop the respective media stream(s).

In step S230, the interworking control portion, such as the MGCF 4, initialize a signalling negotiation between the network and the party not being capable of performing the instructed media composition change, for example a signalling negotiation between the MGW 8 and the CS UE 2. Such a signalling negotiation may be executed in order to rearrange the available resources negotiated for the original communication connection. For example, the bandwidth of the media stream(s) not concerned by the media composition change instruction, like the audio component of the session or a data transmission component, can be increased by at least a part of the bandwidth assigned to the hitherto video component which is released or reduced by the media composition change. Alternatively or additionally, an audio codec can be changed in order to increase the quality of speech. In step S240, the communication connection parameters of the ongoing session are adjusted in accordance with the results of the negotiation between the network and the CS side. Such an adjustment may also concern the other party side, e.g. the IMS side.

Figure 11:
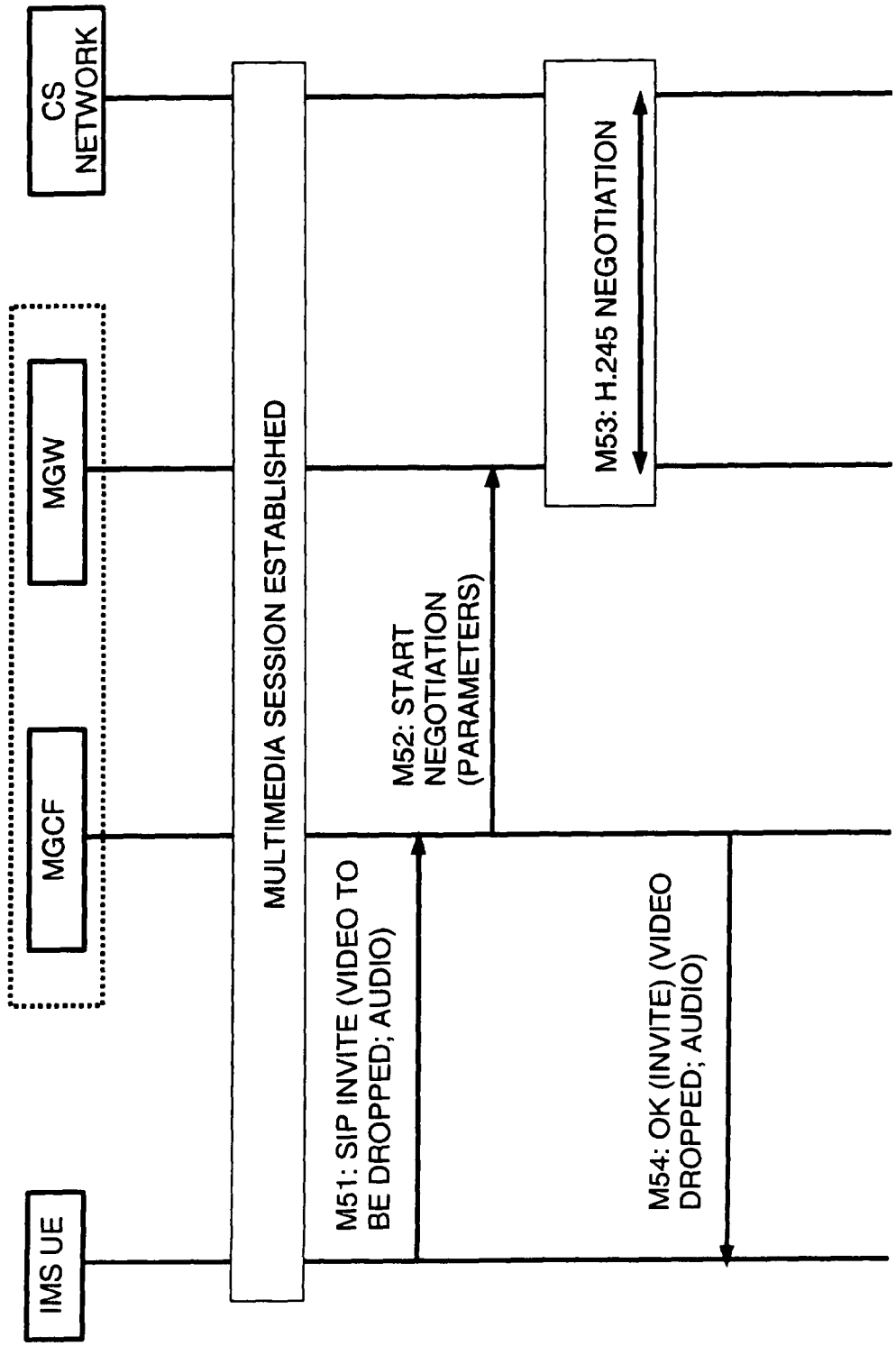
FIG. 11 shows a signalling diagram of an interworking control according to another example of an embodiment of the present invention.

In FIG. 11, a signalling diagram describing a respective signalling flow in the network environment according to FIG. 1 when executing an interworking control according to the present example of an embodiment of the invention is shown.

According to FIG. 11, during an established multimedia session, an instruction from the IM CN subsystem is received instructing a modification from multimedia to speech during the ongoing session. As mentioned above, the CS leg supports, for example, ISUP. The interworking control portion MGCF 4 receives a corresponding SIP INVITE message M51 that indicates the dropping of the video media from the session. The MGCF 4 can only accept the dropping of the media component and acknowledges the INVITE message M51 with a SIP OK message M54. Furthermore, in message M52, the MGW 8 is triggered by the MGCF 4 to start a negotiation with the CS side for rearranging the hitherto resources of the multimedia session in order to optimize the connection parameters for the (remaining) media streams, such as an optimization of the use of CS traffic channels after dropping the video component from the end-to-end session. This negotiation is executed by messages M53 in the form of a ITU-T H.245 protocol negotiation, for example. However, also other protocols may be involved in the negotiation processing of message M53.

In the described interworking control mechanism according to the embodiments of the present invention, the following is executed:

- A parameter may be added in a signalling towards one party, such as SDP/SIP to IMS. The interworking control portion, such as a MGCF, generates the parameter towards the IMS UE. The forthcoming IMS UEs interpret the parameter and show/indicate a message to the user.
- The interworking control portion, like the MGCF, may initiate the sending of an announcement, such as a video announcement, from the network to the CS terminal, or the MGCF may send an indication to the CS terminal, to inform the CS user about the dropping of the video stream.
- The interworking control portion, like the MGCF, may initiate a (H.245 inband or possibly outband) negotiation between the MGW and the CS terminal in order to modify the remaining session streams, such as to rearrange the available bandwidth and possibly to change the speech codec to a better one.

Even though the examples of the embodiments of the present invention described above are related to a communication connection between two parties, it is to be noted that the described interworking control is also applicable in a case where more than two parties are involved. This applies also to cases where more than one party are incapable to execute a media composition change as well as to cases where more than one party are capable to execute a media composition change as long as one party of the communication connection is incapable to execute a media composition change.

Furthermore, even though the examples described above are related at least in part to a situation where one party is located in an IMS environment while the other party is located in a CS network, the interworking control mechanism as described above is also applicable to other network environments as long as a change of the connection parameters during an ongoing call or session is not supported by at least one of the involved parties. In addition, the media composition change is not only related to an abandonment of a video stream but may applied equivalently also to an abandonment of one or more other media components, such as data, speech and the like.

The examples of the embodiments described above can be combined with each other in a suitable manner, as desired.

In particular, the interworking control example according to FIGS. 2 to 6 can be suitably combined with the example according to FIGS. 7 to 10. For example, when the information element indicating the incapability of at least one party for the media composition change and transmitted to the party capable to execute and instruct the media composition change (e.g. the IMS UE 1) can not be interpreted by this party, the media composition change may be instructed anyway, so that the other party (i.e. the party incapable to execute the media composition change, like the CS UE 2) can be provided with a corresponding announcement as described, for example, in connection with FIG. 10.

Another suitable combination of the examples described above is a combination of the interworking control example according to FIGS. 7 to 10 and that according to FIGS. 11 and 12. This means that in parallel to the transmission of an announcement to the party incapable to execute the media composition change, a negotiation for optimizing the connection to this party can be initiated. Similarly to the case described above, the combination of the mechanisms according to FIGS. 7 to 12 may also be combined with the mechanism according to FIGS. 2 to 6.

Furthermore, it is also possible to combine the interworking control according to FIGS. 2 to 6 with that of FIGS. 11 and 12. In such a case, when the information element sent to the party capable to execute and instruct the media composition change is not interpreted correctly, when a media composition change instruction is received, the negotiation between the network and the party incapable to execute the media composition change is initiated.

When two or more of the examples described above are combined in an application, it is also possible to combine function elements of devices, such as of the interworking control portions shown in FIGS. 3 and 7, with each other in order to reduce the number of necessary parts. For example, the respective processing functions, I/O units, determining functions, and information element generation functions may be combined with each other.

As described above, an interworking control mechanism for a communication connection between at least two parties located in different networks provides the following functions: a parameter may be added in a signalling towards one party, which interprets the parameter and shows/indicates a message to the user that a media composition change is not possible and thus prevented even if it would be instructed; otherwise, an announcement is sent from the network to the other party being incapable to execute the media composition change to inform the user about the dropping of a media stream; and a negotiation between the network and the terminal device of the party being incapable to execute the media composition change is initiated in order to modify the remaining session streams, such as to rearrange the available bandwidth and possibly to change a codec to a better one.

It should be understood that the above description and accompanying figures are merely intended to illustrate the present invention by way of example only. The preferred embodiments of the present invention may thus vary within the scope of the attached claims.

The invention claimed is:

1. A method comprising:
acquiring an instruction from a second party of a communication connection to change a media composition of the communication connection;
acknowledging the instruction to change the media composition of the communication connection;
maintaining the media composition of the communication connection and resources of the communication connection for a first party; and
transmitting an indication informing about the change of the media composition of the communication connection to the first party of the communication connection.

2. The method according to claim 1 further comprising:
using at least one of a still picture, a moving picture, and a text message for the indication transmitted to the first party.

3. The method according to claim 1 further comprising:
transmitting the indication to the first party via a channel of the communication connection concerned with the change of media composition instructed by the second party.

4. The method according to claim 1 further comprising:
transmitting the indication to the first party by a signaling procedure.

5. The method according to claim 1, wherein the change of the media composition comprises an abandonment of at least a media component of the communication connection.

6. An apparatus comprising:
at least one processor;
at least one memory;
wherein the at least one processor and at least one memory provide operations comprising:
acquiring an instruction from a second party of a communication connection to change a media composition of the communication connection;
acknowledging the instruction to change the media composition of the communication connection;
maintaining the media composition of the communication connection and resources of the communication connection for a first party; and
transmitting an indication informing about the change of the media composition of the communication connection to the first party of the communication connection.

7. The apparatus according to claim 6 further configured to comprising:
using at least one of a still picture, a moving picture, and a text message for the indication transmitted to the first party.

8. The apparatus according to claim 6 further comprising:
transmitting the indication to the first party via a channel of the communication connection concerned with the change of media composition instructed by the second party.

9. The apparatus according to claim 6 further comprising:
transmitting the indication to the first party by a signaling procedure.

10. The apparatus according to claim 6, wherein the change of the media composition comprises an abandonment of at least a media component of the communication connection.

11. A method comprising:
acquiring an instruction from a second party of a communication connection to change a media composition of the communication connection; and
initiating a signaling negotiation for modifying parameters of the communication connection between a network gateway node or an interworking node and a first party of the communication connection, when the instruction indicates an incapability of the change at the first party.

12. The method according to claim 11, wherein
modifying the parameters of the communication connection comprises at least one of a bandwidth rearrangement for increasing a bandwidth of media components not concerned by the instruction to change the media composition, and a change of codec used for media components not concerned by the instruction to change the media composition.

13. The method according to claim 11, wherein
the change of the media composition comprises an abandonment of at least a media component of the communication connection.

14. An apparatus comprising
at least one processor;
at least one memory;
wherein the at least one processor and at least one memory provide operations comprising:
acquiring an instruction from a second party of a communication connection to change a media composition of the communication connection; and
initiating a signaling negotiation for modifying parameters of the communication connection between a network gateway node or an interworking node and a first party of the communication connection, when the instruction indicates an incapability of the change at the first party.

15. The apparatus according to claim 14, wherein
modifying the parameters of the communication connection comprises at least one of a bandwidth rearrangement for increasing a bandwidth of media components not concerned by the instruction to change the media composition, and a change of codec used for media components not concerned by the instruction to change the media composition.

16. The apparatus according to claim 14, wherein
the change of the media composition comprises an abandonment of at least a media component of the communication connection.

17. The apparatus according to claim 14, wherein
the apparatus is configured to function as an interworking control node, in particular a media gateway control function.

* * * * *